(12) United States Patent
Glickman et al.

(10) Patent No.: US 10,366,286 B2
(45) Date of Patent: Jul. 30, 2019

(54) DETECTION OF TRAFFIC LIGHT SIGNAL CHANGES

(71) Applicant: Google Inc., Mountain View, CA (US)

(72) Inventors: Seth Glickman, San Francisco, CA (US); Emil John Feig, Redwood City, CA (US)

(73) Assignee: Google LLC, Mountain View, CA (US)

(*) Notice: Subject to any disclaimer, the term of this patent is extended or adjusted under 35 U.S.C. 154(b) by 247 days.

(21) Appl. No.: 15/377,008

(22) Filed: Dec. 13, 2016

(65) Prior Publication Data

US 2018/0165500 A1    Jun. 14, 2018

(51) Int. Cl.
| | |
|---|---|
| *H04N 7/18* | (2006.01) |
| *H04N 5/232* | (2006.01) |
| *G06K 9/00* | (2006.01) |
| *G06T 7/90* | (2017.01) |
| *G08G 1/0962* | (2006.01) |

(52) U.S. Cl.
CPC ....... *G06K 9/0061* (2013.01); *G06K 9/00604* (2013.01); *G06K 9/00832* (2013.01); *G06T 7/90* (2017.01); *G08G 1/09623* (2013.01); *H04N 5/23293* (2013.01); *H04N 7/183* (2013.01); *H04N 7/188* (2013.01); *G06K 9/00825* (2013.01); *G06T 2207/10024* (2013.01); *G06T 2207/30041* (2013.01); *G06T 2207/30268* (2013.01)

(58) Field of Classification Search
CPC ............. G06K 9/0061; G06K 9/00604; G06K 9/00832; H04N 7/183; H04N 5/23293; H04N 7/188; G06T 7/90; G06T 2207/30268; G06T 2207/10024; G06T 2207/30041

USPC .......................................................... 348/148
See application file for complete search history.

(56) References Cited

U.S. PATENT DOCUMENTS

| | | | |
|---|---|---|---|
| 6,985,073 B1 | 1/2006 | Doan | |
| 8,031,062 B2 | 10/2011 | Smith | |
| 9,305,460 B1 | 4/2016 | Aza | |
| 2011/0060496 A1* | 3/2011 | Nielsen | G06Q 10/0631 701/31.4 |
| 2011/0182475 A1 | 7/2011 | Fairfield et al. | |
| 2012/0288138 A1 | 11/2012 | Zeng | |
| 2014/0097748 A1* | 4/2014 | Kato | B60Q 9/008 315/77 |

(Continued)

OTHER PUBLICATIONS

International Search Report and Written Opinion for PCT/US2017/054464 dated Feb. 7, 2018, 17 pages.

(Continued)

*Primary Examiner* — Zaihan Jiang
(74) *Attorney, Agent, or Firm* — Dority & Manning, P.A.

(57) ABSTRACT

Systems and methods of detecting traffic light signal changes are disclosed. For instance, it can be determined that a user is stopped at an intersection having a traffic light. A plurality of images can be captured in response to detecting that the user is stopped at the intersection having a traffic light. The plurality of images do not depict the traffic light. A tonal shift in one or more color values associated with at least one image of the plurality of images can be detected. The tonal shift is indicative of a change in signal provided by the traffic light. A notification indicative of the change in signal provided by the traffic light can be provided to the user.

12 Claims, 2 Drawing Sheets

(56) References Cited

U.S. PATENT DOCUMENTS

| | | | |
|---|---|---|---|
| 2014/0253701 A1* | 9/2014 | Wexler | A61F 9/08 |
| | | | 348/62 |
| 2014/0330479 A1* | 11/2014 | Dolgov | B60W 30/16 |
| | | | 701/28 |
| 2015/0029039 A1* | 1/2015 | Mukaiyama | G08G 1/096716 |
| | | | 340/905 |
| 2015/0187214 A1 | 7/2015 | Ichikawa et al. | |
| 2016/0125255 A1* | 5/2016 | Saitwal | G06K 9/38 |
| | | | 382/165 |
| 2016/0272113 A1* | 9/2016 | Lopez-Hinojosa | H04W 4/90 |
| 2016/0293003 A1* | 10/2016 | Ng | G08G 1/091 |
| 2016/0314689 A1 | 10/2016 | Priest, III | |
| 2016/0318490 A1* | 11/2016 | Ben Shalom | B60T 7/12 |
| 2016/0328629 A1* | 11/2016 | Sinclair | H04N 5/2253 |
| 2016/0366547 A1* | 12/2016 | Hodges | H04W 4/02 |
| 2017/0187963 A1* | 6/2017 | Lee | G06F 3/013 |
| 2017/0330455 A1* | 11/2017 | Kikuchi | G06K 9/00798 |

OTHER PUBLICATIONS

Ashe., "App Tells You When Traffic Light Will Change", Aug. 5, 2015, retrieved on Dec. 12, 2016. www.toppayday.xyz/apps/2015/08/app-tells-traffic-light-will-change/—2 pages.

* cited by examiner

DETECTION OF TRAFFIC LIGHT SIGNAL CHANGES

FIELD

The present disclosure relates generally to detecting traffic light signal changes.

BACKGROUND

Traffic lights are signaling devices that can be placed at road intersections, pedestrian crossings, and other locations to control the flow of traffic. For instance, traffic lights can provide varying signals to users (e.g. drivers, pedestrians, etc.) instructing the users to perform an action associated with the signals. For instance, a red light can indicate to a user to bring the user's vehicle to a stop. A green light can indicate to a user to proceed through the intersection.

Users who are stopped at red lights often find ways to occupy themselves while waiting for the light to turn green. For instance, upon bringing their vehicles to a stop at a red light, users may pick up their smartphones and interact with the smartphones. Often, such occupied users can fail to notice a traffic light that has changed to green, and can hold up traffic until they notice such change. Conventional techniques for detecting traffic light signal changes include coupling a vehicle (e.g. one or more computing devices associated with the vehicle) to a network associated with a traffic system. Such traffic system can provide notifications to the vehicle indicative of a traffic light signal. Further techniques for detecting traffic light signal changes include capturing images that depict the traffic light, and detecting the signal change from the images. However, such techniques require the images to depict the traffic light, so that the signal change can be seen directly in the images.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of detecting a traffic light signal change. The method includes determining, by a user device, that a user is stopped at an intersection having a traffic light. The method further includes capturing, by the user device, a plurality of images in response to detecting that the user is stopped at the intersection having a traffic light. The plurality of images do not depict the traffic light. The method further includes detecting, by the user device, a tonal shift in one or more color values associated with at least one image of the plurality of images. The tonal shift is indicative of a change in signal provided by the traffic light. The method further includes providing, by the user device, a notification to the user indicative of the change in signal produced by the traffic light.

Other example aspects of the present disclosure are directed to systems, apparatus, tangible, non-transitory computer-readable media, user interfaces, memory devices, and electronic devices for detecting traffic light signal changes.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
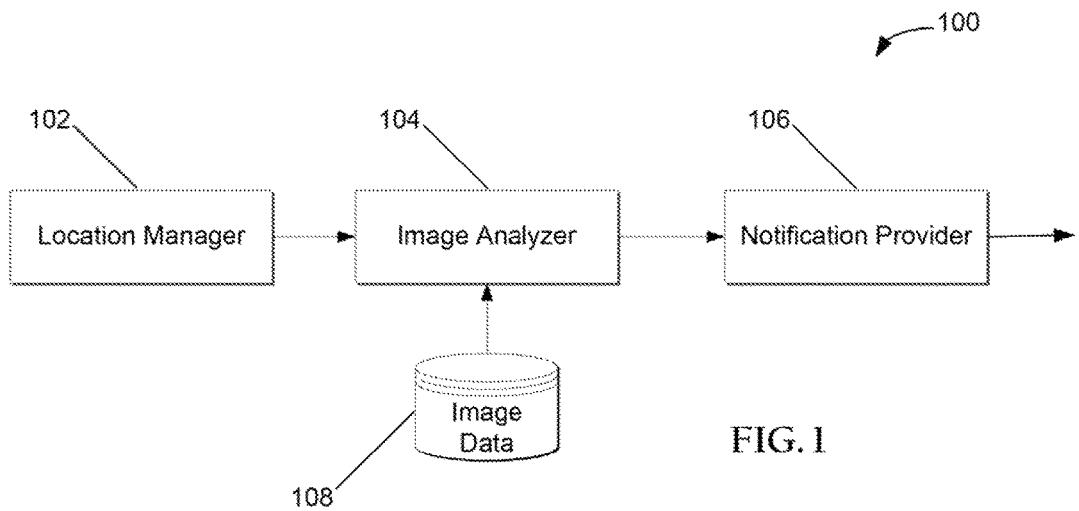
FIG. 1 depicts an example system for detecting traffic light signal changes according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to detecting traffic light signal changes by a user device. For instance, a user device associated with a user can be configured (if the user provides consent) to detect that the user is stopped at an intersection having a traffic light (e.g. a "light intersection"). In response to detecting that the user is stopped at the light intersection, the user device can be configured (with the user's consent) to capture a sequence of images by an image capture device associated with the user device. The images can be analyzed to detect a tonal change associated with one or more pixels that define the images. The tonal change can be associated with particular color space. A detection of such tonal change can be indicative of a change in the traffic light signal (e.g. a change from a red light to a green light). In response to detecting such tonal change, a traffic signal change can be inferred by the user device. A notification can be provided to the user informing the user of the inferred signal change.

More particularly, the user device can be a smartphone, tablet, wearable computing device (e.g. fitness band, smart watch, smart clothing, etc.), laptop computer, or any other suitable user device. The user device can detect that the user is stopped at an intersection having a traffic light using a suitable positioning system (e.g. a GPS system) associated with the user device. The positioning system can be used to determine a physical location of the user device. In some implementations, one or more position sensors (e.g. inertial measurement units, gyroscopes, accelerometers, etc.) can be used, for instance, in conjunction with the positioning system) to determine the physical location. Such physical location can be compared to a known placement of traffic lights. In this manner, it can be determined that the user device is located at an intersection having a traffic light. When the user has been located at such intersection for a threshold period of time, it can be inferred that the user is located in a vehicle that is stopped at a red light.

In response to such inference, and if the user provides consent, a plurality of images can be captured by an image capture device associated with (e.g. implemented within) the user device. The image capture device can be any suitable image capture device. For instance, the image capture device can be a "front facing" image capture device associated with the user device (e.g. smartphone) or a "rear facing" image capture device associated with the user device. Such images can depict, for instance, one or more surfaces of the interior of the vehicle in which the user device is located. In this manner, the images may not depict the traffic light itself. Color information associated with the images can be obtained. For instance, the images can be made up of a plurality of pixels, each having an associated color value. The color value associated with a pixel can be associated with any suitable color space, such as RGB, CMYK, HSV, YUV, RGB and infrared, RGB and ultraviolet, RGB and ultraviolet and infrared, or other suitable color spaces, including any combination of such spaces, whether trichromatic, tetrachromatic, or hyperspectral. The color value can be, for instance, a color vector having a plurality of components that define the various color intensity values associated with the image pixel with respect to the color space. For instance, a color vector associated with a pixel can include a red intensity component, a green intensity component, and a blue intensity component respectively describing the intensities of red, green, and blue which form the color of the pixel. As another example, the color vector can include an ultraviolet component, an infrared component, or other suitable components.

The images can be analyzed to detect a tonal shift in one or more color values associated with the pixels in the respective images indicative of a traffic light signal change. For instance, a first image can be captured by the image capture device. The first image can be a baseline image against which one or more subsequent images can be compared. The color values of the first image can be associated with color values associated with an image obtained during a red light. A second image can be captured by the image capture device, and compared against the first image. More particularly, the color values representing the color as of one or more surfaces of the vehicle (e.g. the interior of the vehicle) depicted by the second image can be compared against corresponding color values of the first image to detect a tonal change in the images indicative of a traffic light signal change. For instance, such tonal change can be associated with an increase of a green intensity component of one or more color values of the second image relative to the first image. It will be appreciated that the tonal shift can be any suitable tonal shift indicative of a traffic light signal change.

If such tonal change is determined, a traffic light signal change can be inferred, and a notification can be provided to the user. For instance, a notification can be presented by a user interface associated with the user device. The notification can be any suitable notification, such as a visual notification displayed within the user interface, an audio notification output by one or more audio devices associated with the user device, or other suitable notification. The notification can indicate to the user that the traffic light has changed signals (e.g. from red light to green light).

If such tonal change is not determined based on the comparison of the first and second images, a third image can be captured by the image capture device. The color values associated with the third image can be compared against corresponding color values of the first image and/or the second image to detect a suitable color change. The process can be repeated until a suitable tonal change is detected and/or until a position change of the user device is detected (e.g. the user device is no longer located at the intersection having the traffic light).

In some implementations, one or more image processing techniques can be applied to the images to facilitate the detection of the suitable tonal shift. For instance, a saturation of the images captured by the image capture device can be increased. The images can then be analyzed according to example aspects of the present disclosure to detect a suitable tonal shift.

As indicated, the images captured by the image capture device can depict one or more surfaces of the interior of the vehicle. For instance, upon stopping at a red light, the user may position the user device such that the user can view a display device associated with the user device. In this manner, the user device can be positioned such that a field of view of the image capture device is associated with the one or more interior surfaces of the vehicle. The user device can then be configured (with the user's consent) to detect a change in the reflection of light provided by the traffic light off of the one or more interior surfaces.

In some implementations, the user device can be configured to detect a change in the reflection of light provided by the traffic light off of one or more surfaces of the user. For instance, the user device can be configured to detect light reflected by an eye of the user. More particularly, in implementations wherein the image capture device is a "front facing" image capture device, a reflection of light provided by the traffic signal off of the user's eye can be detected. In this manner, when the user stops at the red light, the user can position the user device such that a field of view of the front facing image capture device corresponds to an eye of the user. In such implementations, the front facing image capture device can be configured to capture images, and the color values of one or more pixels associated with the user's eye can be analyzed according to example aspects of the present disclosure to detect a suitable tonal change associated with the light reflected from the user's eye. In such implementations, one or more image classification techniques can be used to recognize or identify the user's eye.

In some implementations, detecting light changes associated with the user's eye(s) can be performed in the event that light provided by the traffic light cannot be detected from the images depicting the one or more surfaces of the vehicle. In this manner, the captured images can be analyzed to detect a red hue in the images associated with the light provided by the traffic light. If no such red hue can be detected, an eye of the user can be identified. The eye, as depicted in the images can be analyzed to detect a red light reflecting from the eye, and a tonal shift indicative of a green light reflecting from the eye. Such tonal shift can be indicative of a traffic light signal change.

In some implementations, in order to obtain the benefits of the techniques described herein, a user may be required to allow the collection and analysis of location information associated with a user or device. For example, in some implementations, users may be provided with an opportunity to control whether programs or features collect such information. If the user does not allow collection and use of such signals, then the user may not receive the benefits of the techniques described herein (e.g. may not be provided information associated with semantic place name). The user can also be provided with tools to revoke or modify consent. In addition, certain information or data can be treated in one or more ways before it is stored or used, so that personally identifiable information is removed. For example, embodiments of the disclosed technology can be configured to enhance user privacy by removing identifiers for mobile devices or users. In some instances, device and/or user identifiers can be replaced with a lossy device indicator which might conflate a large number of devices or users into a single identifier.

Referring now to the figures, example aspects of the present disclosure will be discussed in greater detail. For instance, FIG. 1 depicts an example system 100 for detecting traffic light signal changes according to example embodiments of the present disclosure. The system 100 includes a location manager 102, an image analyzer 104, and a notification provider 106. The location manager 102 can be configured to determine a location of a user and/or a user device (e.g. upon receiving user consent). For instance, the location manager 102 can be configured to determine the location of the user device based at least in part on a positioning system (e.g. GPS system) associated with the user device. In some implementations, the location manager 102 can be configured to determine the location of the user device based at least in part on one or more sensors (e.g. inertial measurement units, accelerometers, gyroscopes, etc.) implemented within the user device.

The location manager 102 can be configured to compare the determined location of the user device to known, predefined locations of traffic lights to determine whether the user is located proximate an intersection or other location that has a traffic light. Such known locations of traffic lights can be provided by any suitable source. In some implementations, data indicative of the traffic light locations can be stored locally on the user device. The location manager 102 can further be configured to determine whether the user is stopped at such traffic light. In this manner, if the user is located proximate the traffic light (e.g. in one or more positions indicative of being stopped at the traffic light) for some threshold period of time, it can be determined that the user is stopped at the traffic light.

In response to a determination by the location manager 102 that the user is stopped at a traffic light, one or more images can be captured by an image capture device associated with the user device (e.g. upon receiving user consent). The image capture device can be any suitable image capture device, such as a CMOS device, a CCD device, etc. In some implementations, the image capture device can be implemented within the user device.

Upon a determination by the location manager 102 that the user is stopped at a traffic light, the image analyzer 104 can be configured to obtain image data 108 and to detect a traffic light signal change based at least in part on the image data 108. In some implementations, the image analysis can be performed in response to a determination that the user is interacting with the user device. For instance, the location manager 102 can determine such interaction based on one or more user inputs provided by the user. In some implementations, the location manager 102 can determine such interaction using the sensors associated with the user device and/or an image capture device associated with the user device.

The image data 108 can include digital images captured by the image capture device. The images can depict one or more surfaces of the vehicle and/or the user. It will be appreciated that the images may not depict the traffic light. The images can be defined by a plurality of pixels, each having associated color values associated with a suitable color space. The image analyzer 104 can be determined to analyze the color values to determine a tonal shift indicative of a traffic light signal change. For instance, the image analyzer 104 can obtain a plurality of color values associated a first image from the image data 108. In some implementations, such color values can be set as baseline color values, to which corresponding color values of one or more subsequent images will be compared. In this manner, it can be inferred that the color values associated with the first image can be color values that represent a reflection of red light provided by the traffic light off of one or more surfaces of the interior of the vehicle and/or off of a user's eye(s).

The image analyzer 104 can further obtain color values associated with a second image from the image data 108. The image analyzer 104 can compare the color values associated with the second image to corresponding color values associated with the first image. In some implementations, such corresponding color values can be color values associated with corresponding pixel locations of the first image. In this manner, a color value associated with a first pixel location in the first image can be compared against a color value associated with a pixel located at a corresponding position in the second image.

More particularly, the color values associated with the first image and the second image can be compared to detect a tonal shift in the color values indicative of a traffic light signal change. For instance, such tonal shift can be associated with an increase in a green intensity of one or more color values in the second image relative to the first image. Such green intensity increase can be inferred to be caused by green light produced by the traffic light and reflected off the one or more surfaces depicted in the second image. It will be appreciated that the tonal shift can be any suitable tonal shift in any suitable number of color values.

In some implementations, the image analyzer 104 can perform one or more image processing techniques on the image data 108 to facilitate a detection of the suitable tonal shift. For instance, the image analyzer 104 can be configured to increase a saturation associated with the images. In some implementations, such image processing techniques can be performed if a tonal shift cannot initially be detected between the first and second images.

The image analyzer 104 can analyze any suitable number of images until a tonal shift is detected or the location of the user device changes such that the use device is no longer stopped at the traffic light. For instance, the image analyzer 104 can obtain color values associated with a third image and compare such color values to the corresponding color values of the first image and/or the second image. Such process can be repeated until a tonal shift is detected.

Upon a detection of a suitable tonal shift between images, the notification provider 106 can generate a suitable notification and provide the notification to the user. For instance, the notification provider 106 can generate a visual notification (text notification) and/or an audio notification to be presented to the user. The notification can indicate to the user that the traffic light has turned green.

Figure 2:
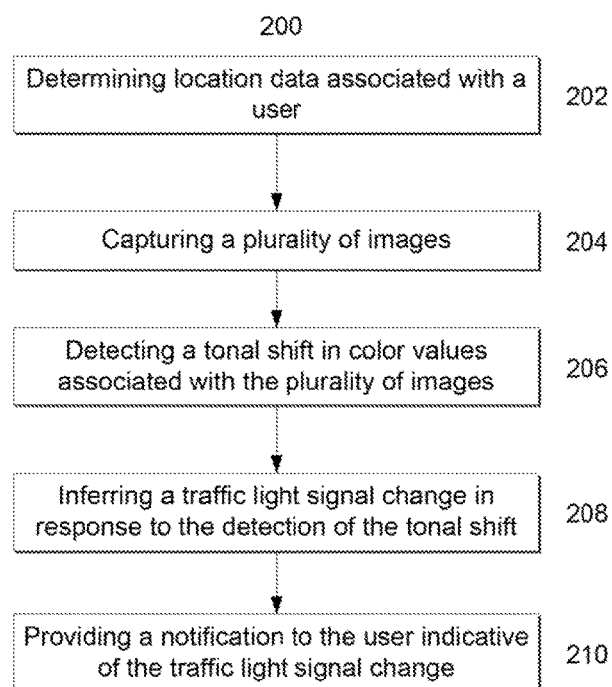
FIG. 2 depicts a flow diagram of an example method of detecting traffic light signal changes according to example embodiments of the present disclosure.

FIG. 2 depicts a flow diagram of an example method (200) of detecting a traffic light signal change according to example embodiments of the present disclosure. The method (200) can be implemented by one or more computing devices, such as one or more of the computing devices depicted in FIG. 3. In particular implementations, the method (200) can be implemented by the location manager 102, the image analyzer 104, and the notification provider 106 depicted in FIG. 1. In addition, FIG. 2 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), the method (200) can include determining location data associated with a user. The location data can be determined using a suitable positioning system (e.g. GPS system) and/or one or more position sensors associated with a user device. The location data can specify that a user is located at an intersection having a traffic light (e.g. stopped in traffic at a traffic light). In this manner, a location of the user (determined by the positioning system and/or sensors) can be compared to known, predefined locations of traffic lights to determine if the user is stopped at a traffic light. For instance, if the user device is located proximate a traffic light, and has not moved (or has not moved substantially) for a threshold period of time, it can be inferred that the user is stopped at the traffic light.

At (204), the method (200) can include capturing a plurality of images. In some implementations, the plurality of images can be captured in response to the determination that the user is stopped at the traffic light. In some implementations, the plurality of images can be captured in response to a determination that the user is stopped at the traffic light and that the user is interacting with the user device. The plurality of images can be a sequence of images captured by one or more image capture devices associated with the user device. The images can depict one or more surfaces of the vehicle and/or the user (e.g. the user's eye(s)). It will be appreciated that the images may not depict the traffic light.

At (206), the method (200) can include detecting a tonal shift in one or more color values associated with the plurality of images. The tonal shift can be a tonal shift that indicates a change in traffic light signal (e.g. a change from a red light to a green light). For instance, the tonal shift can be a change in color values associated with a second image of the sequence relative to color values associated with a first image of the sequence. The tonal shift can be an increase in a green intensity component of one or more color values associated with the second image relative to one or more corresponding color values of the first image. Such increase in green intensity can be inferred to be caused by green light provided by the traffic light. In some implementations, a saturation of the analyzed images can be increased to facilitate a detection of the traffic light signal change according to example aspects of the present disclosure.

At (208), the method (200) can include inferring a traffic light signal change in response to the detection of the tonal shift. At (210), the method (200) can include providing a notification to the user indicative of the traffic light signal change. The method can be any suitable notification. In some implementations, the notification can be provided for display in a user interface associated with the user device. In some implementations, the notification can be an audio notification output by an audio device.

Figure 3:
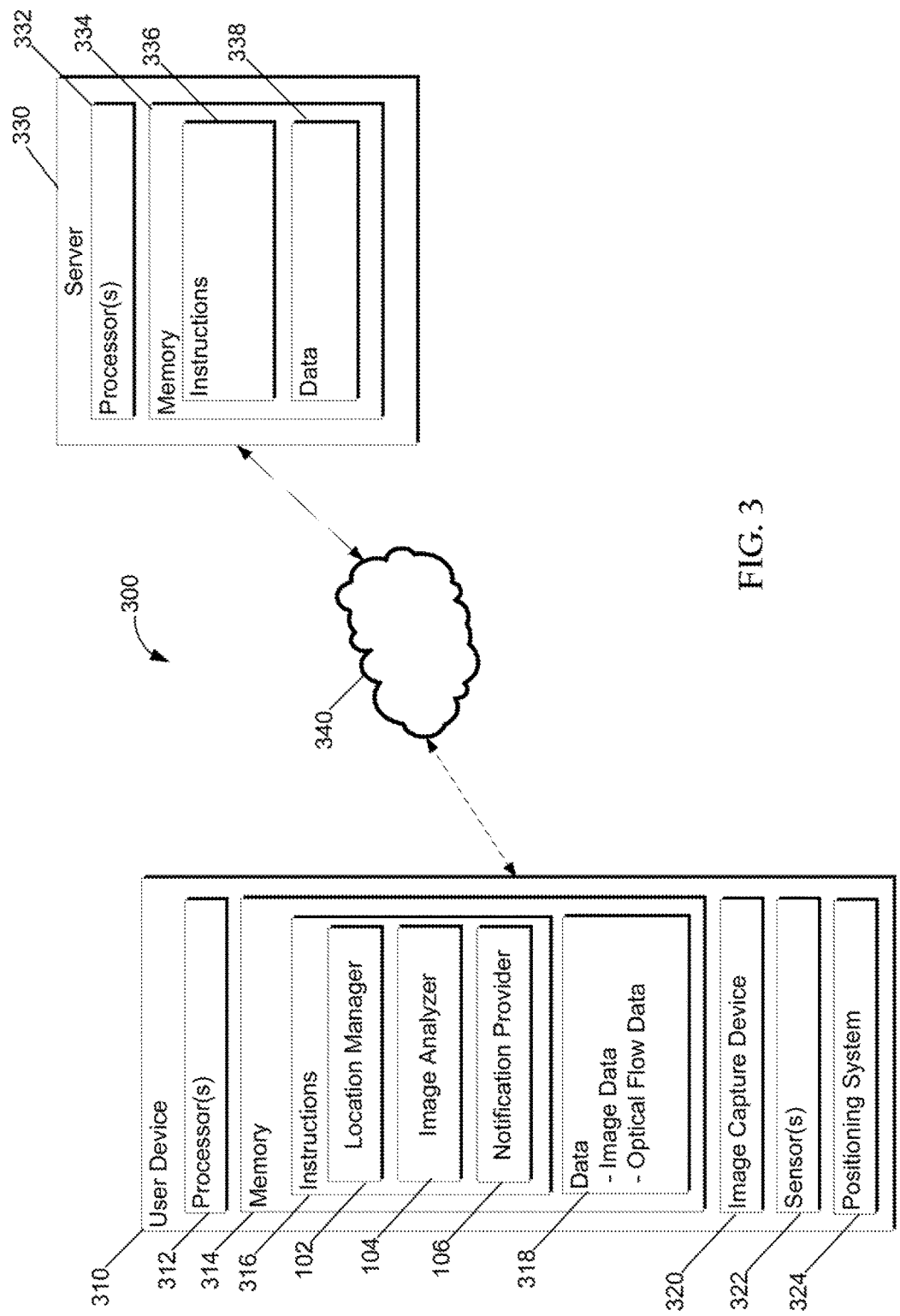
FIG. 3 depicts an example system according to example embodiments of the present disclosure.

FIG. 3 depicts an example computing system 300 that can be used to implement the methods and systems according to example aspects of the present disclosure. The system 300 can be implemented using a client-server architecture that includes user device 310 that can communicate with one or more servers 330 over a network 340. The system 300 can be implemented using other suitable architectures, such as a single computing device.

The system 300 includes a user device 310. The user device 310 can be any suitable user device, such as a general purpose computer, special purpose computer, laptop, desktop, mobile device, navigation system, smartphone, tablet, wearable computing device, a display with one or more processors, or other suitable computing device. The user device 310 can have one or more processors 312 and one or more memory devices 314. The user device 310 can also include a network interface used to communicate with one or more servers 330 over the network 340. The network interface can include any suitable components for interfacing with one more networks, including for example, transmitters, receivers, ports, controllers, antennas, or other suitable components.

The one or more processors 312 can include any suitable processing device, such as a microprocessor, microcontroller, integrated circuit, logic device, graphics processing units (GPUs) dedicated to efficiently rendering images or performing other specialized calculations, or other suitable processing device. The one or more memory devices 314 can include one or more computer-readable media, including, but not limited to, non-transitory computer-readable media, RAM, ROM, hard drives, flash drives, or other memory devices. The one or more memory devices 314 can store information accessible by the one or more processors 312, including computer-readable instructions 316 that can be executed by the one or more processors 312. The instructions 316 can be any set of instructions that when executed by the one or more processors 312, cause the one or more processors 312 to perform operations. For instance, the instructions 316 can be executed by the one or more processors 312 to implement, for instance, the location manager 102, the image analyzer 104 and the notification provider 106 described with reference to FIG. 1.

As shown in FIG. 3, the one or more memory devices 314 can also store data 318 that can be retrieved, manipulated, created, or stored by the one or more processors 312. The data 318 can include, for instance, image data, and other data. The data 318 can be stored locally at the user device 310, or remotely from the user device 310. For instance, the data 318 can be stored in one or more databases. The one or more databases can be connected to the user device 310 by a high bandwidth LAN or WAN, or can also be connected to user device 310 through network 340. The one or more databases can be split up so that they are located in multiple locales.

The user device 310 can include, or can otherwise be associated with, various input/output devices for providing and receiving information from a user, such as a display device, touch screen, touch pad, data entry keys, speakers, and/or a microphone suitable for voice recognition. For instance, the user device can include one or more image capture devices 320. The image capture device(s) 320 can be any suitable image capture device(s). The user device can further include one or more position sensors 322 configured to monitor a location of the user device 310.

The user device 310 can further include a positioning system 324. The positioning system 324 can be any device or circuitry for monitoring the position of the user device 310. For example, the positioning system 324 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The user device 310 can exchange data with one or more servers 330 over the network 340. Any number of servers 330 can be connected to the user device 310 over the network 340. Each of the servers 330 can be implemented using any suitable computing device(s).

Similar to the user device 310, a server 330 can include one or more processor(s) 332 and a memory 334. The one or more processor(s) 332 can include one or more central processing units (CPUs), and/or other processing devices. The memory 334 can include one or more computer-readable media and can store information accessible by the one or more processors 332, including instructions 336 that can be executed by the one or more processors 332 and data 338.

The server 330 can also include a network interface used to communicate with one or more remote computing devices (e.g. user device 310) over the network 340. The network interface can include any suitable components for interfacing with one more networks, including for example, transmitters, receivers, ports, controllers, antennas, or other suitable components.

The network 340 can be any type of communications network, such as a local area network (e.g. intranet), wide area network (e.g. Internet), cellular network, or some combination thereof. The network 340 can also include a direct connection between a server 330 and the user device 310. In general, communication between the user device 310 and a server 330 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Further to the descriptions above, a user may be provided with controls allowing the user to make an election as to both if and when systems, programs or features described herein may enable collection of user information (e.g., information about a user's current location or imaging data). For example, a user may be provided with a control to provide explicit consent to allow a determination of the user's location, to allow the capture of one or more images, and/or to allow the detection of tonal shifts within the captured images to detect a light signal change in accordance with example aspects of the present disclosure. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of detecting a traffic light signal change, the method comprising:
   determining, by a user device, that a user is stopped at an intersection having a traffic light;
   capturing, by the user device, a plurality of images in response to detecting that the user is stopped at the intersection having a traffic light, wherein the plurality of images do not depict the traffic light;
   detecting, by the user device, a tonal shift in one or more color values associated with at least one surface depicted in at least one image of the plurality of images, the at least one surface being separate from the traffic light, the tonal shift being indicative of a change in signal provided by the traffic light; and
   providing, by the user device, a notification to the user indicative of the change in signal produced by the traffic light based at least in part on detecting the tonal shift in the one or more color values associated with the at least one surface that is separate from the traffic light.

2. The computer-implemented method of claim 1, wherein determining, by a user device, that a user is stopped at an intersection having a traffic light comprises:
   determining, by the user device, a location of the user; and
   comparing, by the user device, the location of the user to one or more known locations of traffic lights.

3. The computer-implemented method of claim 1, wherein determining, by a user device, that a user is stopped at an intersection having a traffic light comprises determining that the user device has been located proximate the traffic light for a threshold period of time.

4. The computer-implemented method of claim 1, wherein the plurality of images are captured as a sequence of images.

5. The computer-implemented method of claim 1, wherein the at least one surface includes one or more surfaces of an interior of a vehicle associated with the user.

6. The computer-implemented method of claim 1, wherein the at least one surface includes an eye of the user.

7. The computer-implemented method of claim 1, wherein each image of the plurality of images have a plurality of color values, each color value associated with a pixel of the image.

8. The computer-implemented method of claim 6, wherein the color values comprise color vectors having a plurality of components.

9. The computer-implemented method of claim 1, wherein the tonal shift corresponds to an increase in a green intensity associated with the one or more color values.

10. The computer-implemented method of claim 1, further comprising increasing, by the user device, a saturation of at least one of the plurality of images.

11. A computing system, comprising:
   one or more processors; and
   one or more memory devices, the one or more memory devices storing computer-readable instructions that when executed by the one or more processors cause the one or more processors to perform operations, the operations comprising:

determining that a user is stopped at an intersection having a traffic light;

capturing a plurality of images in response to detecting that the user is stopped at the intersection having a traffic light, wherein the plurality of images do not depict the traffic light;

detecting a tonal shift in one or more color values associated with at least one surface depicted in at least one image of the plurality of images, the at least one surface being separate from the traffic light, the tonal shift being indicative of a change in signal provided by the traffic light; and providing a notification to the user indicative of the change in signal produced by the traffic light based at least in part on detecting the tonal shift in the one or more color values associated with the at least one surface that is separate from the traffic light.

12. One or more tangible, non-transitory computer-readable media storing computer-readable instructions that when executed by one or more processors cause the one or more processors to perform operations, the operations comprising:

determining that a user is stopped at an intersection having a traffic light;

capturing a plurality of images in response to detecting that the user is stopped at the intersection having a traffic light, wherein the plurality of images do not depict the traffic light;

detecting a tonal shift in one or more color values associated with at least one surface depicted in at least one image of the plurality of images, the at least one surface being separate from the traffic light, the tonal shift being indicative of a change in signal provided by the traffic light; and providing a notification to the user indicative of the change in signal produced by the traffic light based at least in part on detecting the tonal shift in the one or more color values associated with the at least one surface that is separate from the traffic light.

* * * * *